US012504290B2

(12) United States Patent
Beaurepaire et al.

(10) Patent No.: US 12,504,290 B2
(45) Date of Patent: Dec. 23, 2025

(54) METHOD TO DETECT OPPORTUNISTIC MIXED MODE TRANSPORTATION VIRTUAL HUBS BASED ON MOBILITY PATTERNS

(71) Applicant: HERE GLOBAL B.V., Eindhoven (NL)

(72) Inventors: Jerome Beaurepaire, Nantes (FR); Jeremy Michael Young, Beverly Hills, MI (US)

(73) Assignee: HERE GLOBAL B.V., Eindhoven (NL)

( * ) Notice: Subject to any disclaimer, the term of this patent is extended or adjusted under 35 U.S.C. 154(b) by 102 days.

(21) Appl. No.: 18/396,737

(22) Filed: Dec. 27, 2023

(65) Prior Publication Data

US 2025/0216208 A1 Jul. 3, 2025

(51) Int. Cl.
*G01C 21/34* (2006.01)
*G01C 21/36* (2006.01)
*G06N 3/096* (2023.01)
*G06V 20/54* (2022.01)

(52) U.S. Cl.
CPC ..... *G01C 21/3461* (2013.01); *G01C 21/3492* (2013.01); *G01C 21/3685* (2013.01); *G01C 21/3694* (2013.01); *G06N 3/096* (2023.01); *G06V 20/54* (2022.01); *G06V 2201/08* (2022.01)

(58) Field of Classification Search
CPC ............ G01C 21/3461; G01C 21/3492; G01C 21/3685; G01C 21/3694; G06V 20/54; G06V 2201/08; G06N 3/096
See application file for complete search history.

(56) References Cited

U.S. PATENT DOCUMENTS

| | | | |
|---|---|---|---|
| 8,589,065 B2 | 11/2013 | Scofield et al. | |
| 8,779,941 B2* | 7/2014 | Amir | G06Q 50/40 340/932.2 |
| 9,064,417 B2* | 6/2015 | Smullin | G01C 21/3685 |
| 9,514,651 B2 | 12/2016 | Linder et al. | |
| 9,766,625 B2 | 9/2017 | Boroditsky et al. | |
| 10,403,143 B2 | 9/2019 | Hetz et al. | |
| 11,506,507 B2 | 11/2022 | Fuchs | |

(Continued)

FOREIGN PATENT DOCUMENTS

| | | |
|---|---|---|
| CN | 106504577 B | 8/2019 |
| EP | 3462389 A1 | 4/2019 |

OTHER PUBLICATIONS

"IEEE 802.11" Wikipedia, Retrieved on Nov. 20, 2023, Webpage available at https://en.wikipedia.org/wiki/IEEE_802.11.

(Continued)

*Primary Examiner* — Ramsey Refai
(74) *Attorney, Agent, or Firm* — Jeffrey R. Moisan; HERE GLOBAL B.V.

(57) ABSTRACT

A system, method and computer program product to detect opportunistic mixed mode transportation virtual hubs are disclosed. The system may allow commuters to benefit from more relevant and contextual recommendations for "park and ride" commutes by algorithmically detecting opportunistic mixed mode transportation virtual hubs based on traffic conditions, parking capacity measures and mobility patterns of commuters.

14 Claims, 6 Drawing Sheets

(56) References Cited

U.S. PATENT DOCUMENTS

2012/0161986 A1* 6/2012 Amir .................. G06Q 50/40
                                                            340/932.2
2020/0242924 A1* 7/2020 Publicover ............ G08G 1/087

OTHER PUBLICATIONS

"IEEE 802.16" Wikipedia, Retrieved on Nov. 20, 2023, Webpage available at https://en.wikipedia.org/wiki/IEEE_802.16.
"IMT-2020" Wikipedia, Retrieved on Nov. 30, 2023, Webpage available at https://en.wikipedia.org/wiki/IMT-2020#:~:text=International%20Mobile%20Telecommunications%2D2020%20(IMT,as%20Recommendation%20ITU%2DR%20M.

* cited by examiner

METHOD TO DETECT OPPORTUNISTIC MIXED MODE TRANSPORTATION VIRTUAL HUBS BASED ON MOBILITY PATTERNS

TECHNOLOGICAL FIELD

An example aspect of the present disclosure generally relates to assisting commuters find convenient parking in urban areas, and more particularly, but without limitation relates to a system, a method, and a computer program product to detect opportunistic mixed mode transportation virtual hubs based on mobility patterns.

BACKGROUND

"Park and Ride" (P&R) lots and networks are a transportation system that allows people to park their vehicles at a designated location, such as a parking lot or garage, and then use public transportation to travel to their final destination. There are several reasons why people may prefer to use a P&R system:

Convenience: P&R allows people to park their cars in a safe and secure location, reducing the need to worry about finding parking at their final destination.

2. Cost savings: P&R can be less expensive than driving and paying for parking at the final destination, especially in urban areas where parking fees can be high.

3. Environmental benefits: P&R can reduce traffic congestion and air pollution, as it encourages people to use public transportation instead of driving.

4. Time savings: P&R can save time, especially in areas where traffic is congested. By parking at a P&R lot and taking public transportation, people can avoid the hassle of navigating through heavy traffic.

Overall, P&R systems offer a convenient, cost-effective, and environmentally friendly alternative to driving and parking at a final destination. However, there are not that many P&R areas overall, leaving commuters to find their own solutions when those P&R locations are not satisfactory for them, leading commuters to park near bus or subway stops, business parking lots or residential parking locations so they can continue their journey riding public transportation to their final destination. These parkers may find their vehicle ticketed, booted or towed if they park in a restricted or commercial area that prohibits parking and leaving the lot.

This also sometimes creates complaints by locals or local shops due to unavailable parking in those areas during the day (area is cluttered by cars, making it hard for the inhabitants to drive or park and preventing people to park to go to local stores).

BRIEF SUMMARY

The present disclosure provides a system, a method and a computer program product to detect opportunistic mixed mode transportation virtual hubs, in accordance with various aspects.

Aspects of the disclosure provide a system to system to detect opportunistic mixed mode transportation virtual hubs. The system may include at least one memory configured to store computer executable instructions; and at least one processor configured to execute the computer executable instructions to: identify, from probe data, an area where an on-street parking capacity and/or an off-street parking capacity is full during week-days; identify whether observed mobility patterns of a vehicle parking in the area comprise commuter parking patterns; identify, based on map data, a location of a public transportation stop within a predetermined range of the area; determine, based on historical traffic data and real-time traffic data, whether an observed traffic congestion increases from a historical traffic congestion level for observed traffic from the public transportation stop to a city center; determine whether a full on-street parking capacity and/or a full off-street parking capacity during the day negatively modifies a mobility pattern of a resident of the area; and determine, based on at least one of the observed mobility pattern of the vehicle parking in the area, the observed traffic congestion and the mobility pattern of the resident of the area, a current virtual "park and ride" index, where the current virtual "park and ride" index comprises a likelihood of the vehicle parking at a current virtual "park and ride."

Aspects of the disclosure provide a computer-implemented method to detect opportunistic mixed mode transportation virtual hubs. The method includes identifying, from probe data, an area where an on-street parking capacity and/or an off-street parking capacity is full during week-days; identifying whether observed mobility patterns of a vehicle parking in the area comprise commuter parking patterns; identifying, based on map data, a location of a public transportation stop within a predetermined range of the area; determining, based on historical traffic data and real-time traffic data, whether an observed traffic congestion increases from a historical traffic congestion level for observed traffic from the public transportation stop to a city center; determining whether a full on-street parking capacity and/or a full off-street parking capacity during the day negatively modifies a mobility pattern of a resident of the area; and determining, based on at least one of the observed mobility pattern of the vehicle parking in the area, the observed traffic congestion and the mobility pattern of the resident of the area, a current virtual "park and ride" index, where the current virtual "park and ride" index comprises a likelihood of the vehicle parking at a current virtual "park and ride."

Aspects of the disclosure provide a computer program product. The computer program product may include a non-transitory computer readable medium having stored thereon computer executable instructions, which when executed by one or more processors, cause the one or more processors to carry out operations to detect opportunistic mixed mode transportation virtual hubs, the operations including: identifying, from probe data, an area where an on-street parking capacity and/or an off-street parking capacity is full during week-days; identifying whether observed mobility patterns of a vehicle parking in the area comprise commuter parking patterns; identifying, based on map data, a location of a public transportation stop within a predetermined range of the area; determining, based on historical traffic data and real-time traffic data, whether an observed traffic congestion increases from a historical traffic congestion level for observed traffic from the public transportation stop to a city center; determining whether a full on-street parking capacity and/or a full off-street parking capacity during the day negatively modifies a mobility pattern of a resident of the area; and determining, based on at least one of the observed mobility pattern of the vehicle parking in the area, the observed traffic congestion and the mobility pattern of the resident of the area, a current virtual "park and ride" index, where the current virtual "park and ride" index comprises a likelihood of the vehicle parking at a current virtual "park and ride."

The foregoing summary is illustrative only and is not intended to be in any way limiting. In addition to the illustrative aspects, aspects, and features described above, further aspects, aspects, and features will become apparent by reference to the drawings and the following detailed description.

BRIEF DESCRIPTION OF THE DRAWINGS

Figure 1:
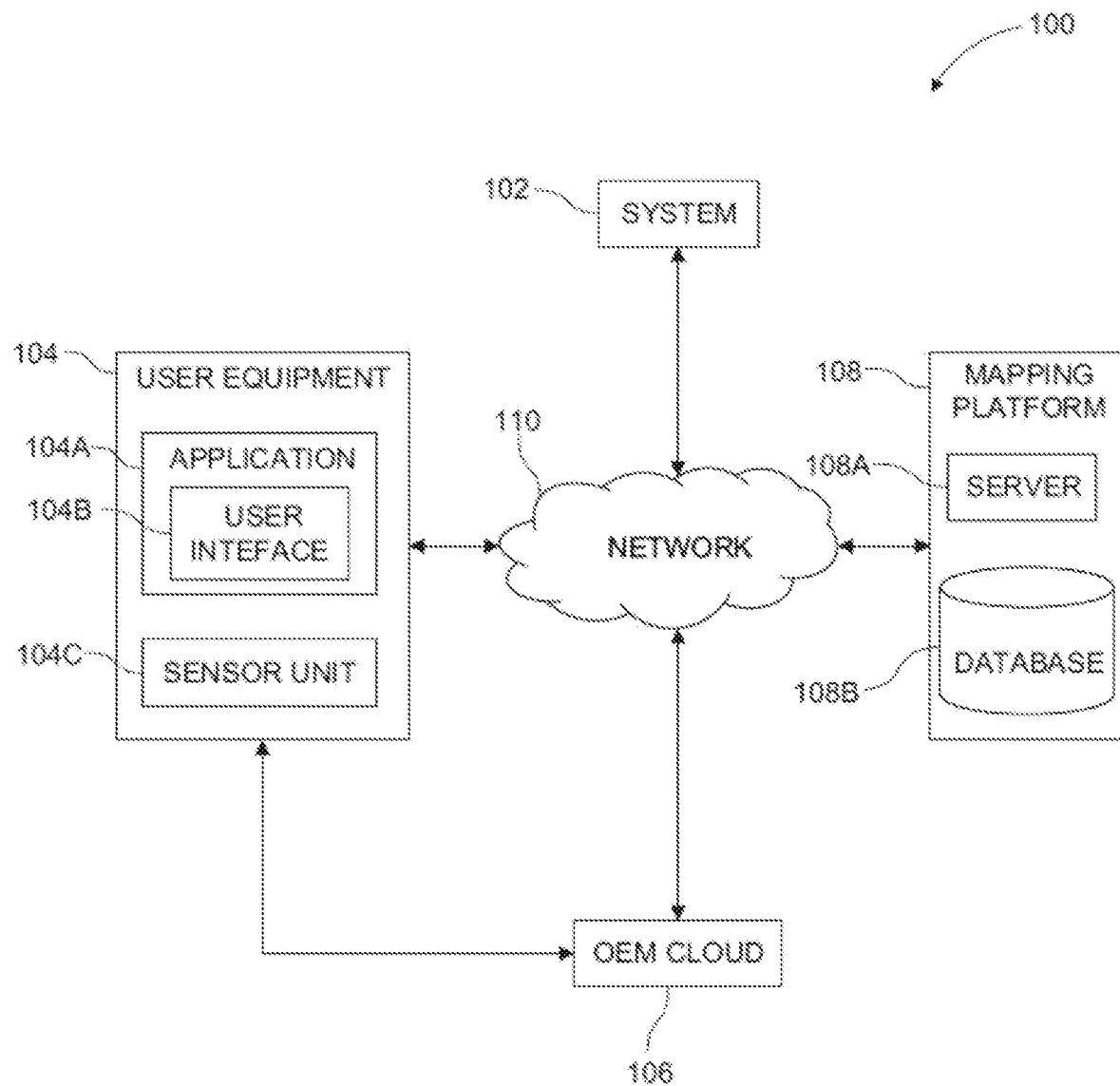
Figure 2:
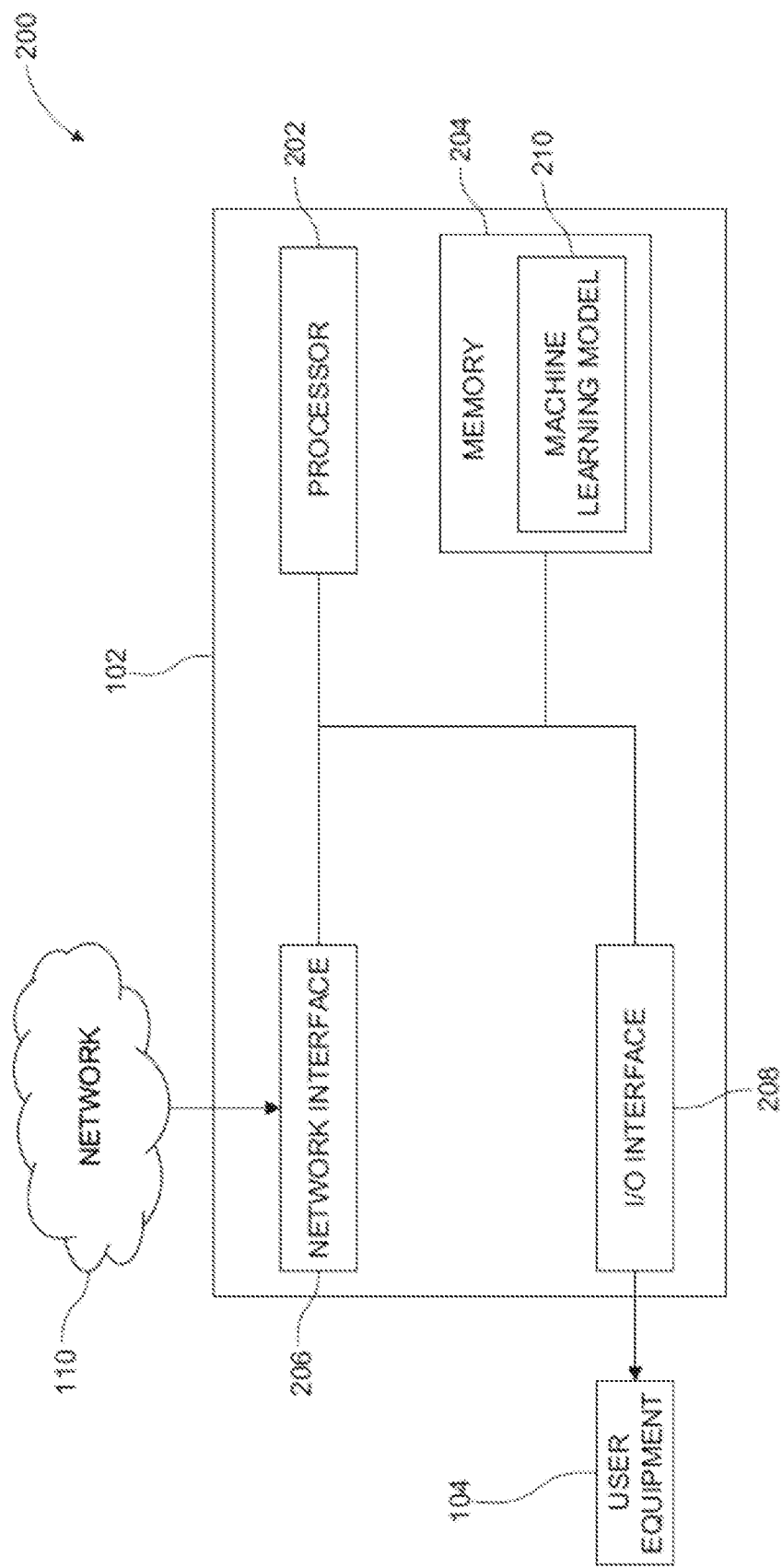
Figure 3:
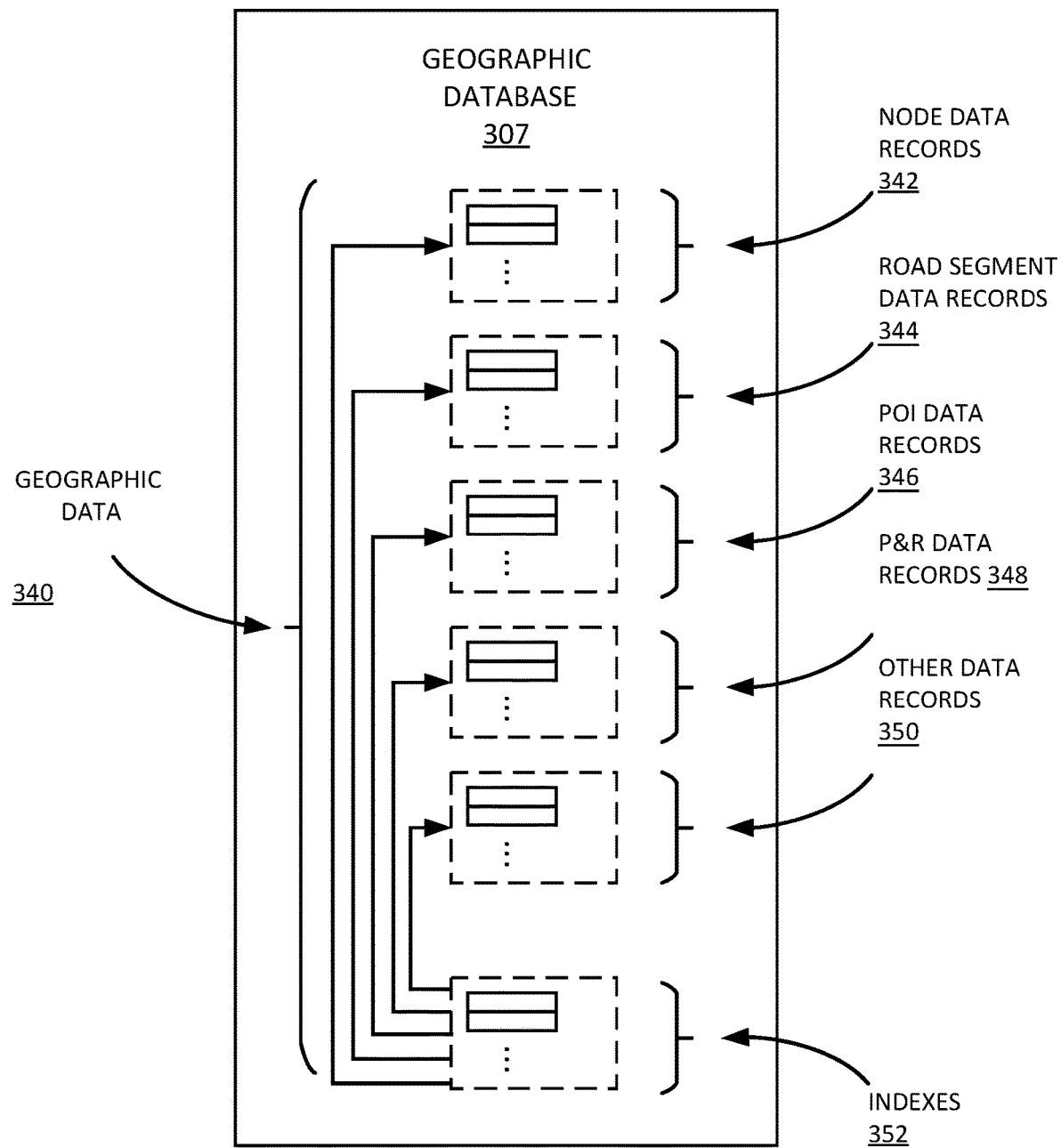
Figure 4:
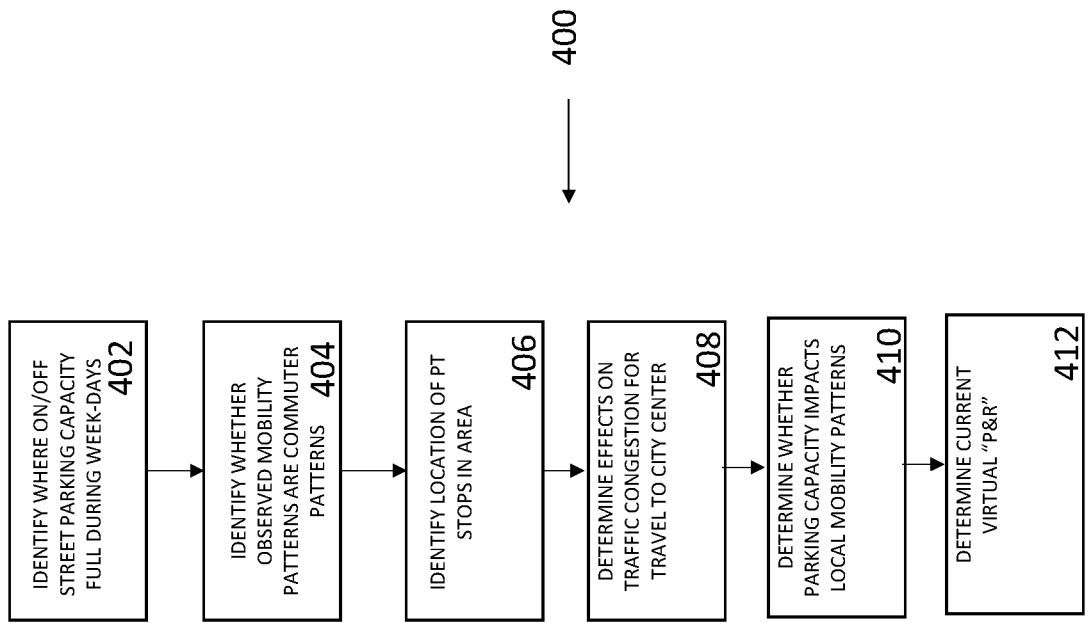
Figure 5:
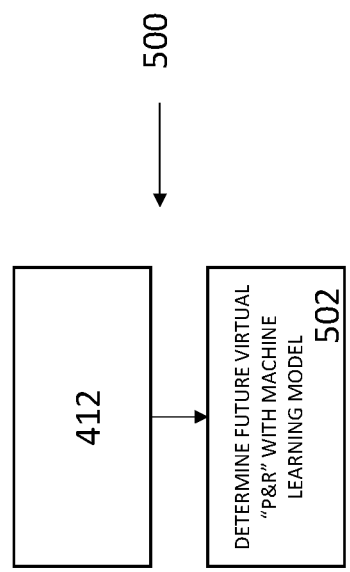
Figure 6:
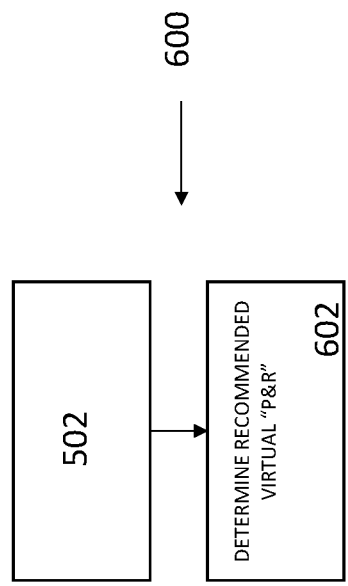

Having thus described certain aspects of the disclosure in general terms, reference will now be made to the accompanying drawings, which are not necessarily drawn to scale, and wherein:

FIG. 1 illustrates a schematic diagram of a network environment 100 of a system 102 for detecting opportunistic mixed mode transportation virtual hubs in accordance with an example aspect;

FIG. 2 illustrates a block diagram of the system for detecting opportunistic mixed mode transportation virtual hubs, in accordance with an example aspect;

FIG. 3 illustrates an example the map or geographic database for use by the system for detecting opportunistic mixed mode transportation virtual hubs, in accordance with an example aspect;

FIG. 4 illustrates a flowchart 400 for acts taken in an exemplary method for detecting opportunistic mixed mode transportation virtual hubs, in accordance with an aspect;

FIG. 5 illustrates a flowchart 500 for acts taken in an exemplary method for detecting opportunistic mixed mode transportation virtual hubs, in accordance with an aspect; and FIG. 6 illustrates a flowchart 600 for acts taken in an exemplary method for detecting opportunistic mixed mode transportation virtual hubs, in accordance with an aspect.

DETAILED DESCRIPTION

Some aspects of the present disclosure will now be described more fully hereinafter with reference to the accompanying drawings, in which some, but not all, aspects are shown. Indeed, various aspects may be embodied in many different forms and should not be construed as limited to the aspects set forth herein; rather, these aspects are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with aspects of the present disclosure. Thus, use of any such terms should not be taken to limit the spirit and scope of aspects of the present disclosure.

For purposes of this disclosure, though not limiting or exhaustive, "vehicle" refers to standard gasoline powered vehicles, hybrid vehicles, an electric vehicle, a fuel cell vehicle, and/or any other mobility implement type of vehicle (e.g., bikes, scooters, etc.). The vehicle includes parts related to mobility, such as a powertrain with an engine, a transmission, a suspension, a driveshaft, and/or wheels, etc. The vehicle may be a non-autonomous vehicle or an autonomous vehicle. The term autonomous vehicle (AV) may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to lane marking indicators (lane marking type, lane marking intensity, lane marking color, lane marking offset, lane marking width, or other characteristics) and driving commands or navigation commands. In one aspect, the vehicle may be assigned with an autonomous level. An autonomous level of a vehicle can be a Level 0 autonomous level that corresponds to a negligible automation for the vehicle, a Level 1 autonomous level that corresponds to a certain degree of driver assistance for the vehicle, a Level 2 autonomous level that corresponds to partial automation for the vehicle, a Level 3 autonomous level that corresponds to conditional automation for the vehicle, a Level 4 autonomous level that corresponds to high automation for the vehicle, a Level 5 autonomous level that corresponds to full automation for the vehicle, and/or another sub-level associated with a degree of autonomous driving for the vehicle.

Modern commuting from suburban to urban city centers has allowed commuters to live in less crowded areas but benefit from job opportunities and recreational activities in a city center. However, access to public transportation to a city center may be difficult during commuter hours and work-days. Solutions are needed to improve the situation in areas where lots of people are parking near public transport stops to take advantage of "Park and Ride" in areas which are not designed for this crush of parking at peak times. The disclosure may help commuters find more relevant "virtual park and ride" opportunities when there are no dedicated P&R areas nearby.

The situation described above can create lots of frustrations to commuters, who have a sub-optimal solution for their commutes; for local people who sometimes encounter too many cars often improperly parked in front of their homes; and local businesses who see less traffic in their shops parking space being available to customers. A solution is needed to identify commuters based on their mobility patterns and suggest them better alternatives to get to work.

An aspect of the disclosure may allow a predictive system to identify the areas where a group of people decides to park in the streets near a public transportation stop in order to create their "own P&R set up", matching their commute needs. For purposes of the disclosure but without limitation, these are termed "Virtual Park & Rides" (vP&R) as they are not officially designed the cities but are used as such by at least a few commuters.

According to an aspect of the disclosure, the disclosed system may:
1. To identify areas suffering from the issues mentioned previously (full on-street parking and/or parking near PT stops);
2. to better understand, learn and detect the patterns (map, mobility, topology, geometry, etc) that those areas have in common; and
3. to suggest intermodal routes or alternative routes which are better both for the commuters and the locals when relevant/possible.

In an aspect, the disclosed system may perform pattern analysis to identify the areas with such issue. To find out the areas which have the above-mentioned issues, the system will perform the following actions, based on probe data or other sensor inputs:

identify, from probe data, an area where an on-street parking capacity and/or an off-street parking capacity is full during week-days;

identify whether observed mobility patterns of a vehicle parking in the area comprise commuter parking patterns, such as arriving 7-9 am and leaving 5-7 pm (possibly also using camera based observations);

identify, based on map data, a location of a public transportation stop within a predetermined range of the area, such as 1 km-1.5 km;

determine, based on historical traffic data and real-time traffic data, whether an observed traffic congestion increases from a historical traffic congestion level for observed traffic from the public transportation stop to a city center;

determine whether a full on-street parking capacity and/or a full off-street parking capacity during the day negatively modifies a mobility pattern of a resident of the area; and determine, based on at least one of the observed mobility pattern of the vehicle parking in the area, the observed traffic congestion and the mobility pattern of the resident of the area, a current virtual "park and ride" index (vP&R_Current_Index), where the current virtual "park and ride" index comprises a likelihood of the vehicle parking at a current virtual "park and ride." For purposes of the disclosure, the vP&R_Current_Index may have a value between 0 and 1. The vP&R_Current_Index may be displayed on a map on a visual display or as an input to other algorithms.

In an aspect, the system may implement a second algorithm, based on trained machine learning (ML), which may learn from those patterns, correlated with map features, in order to predict which areas are likely to be used as "Virtual P&R areas" by users and possibly see similar issues in the future. In an aspect, the system may use using a trained machine learning model based on the current virtual "park and ride" index and area map features, a future virtual "park and ride" index, where the future virtual "park and ride" index comprises a likelihood of the vehicle parking at a future virtual "park and ride." In another aspect, the trained ML model may employ transfer learning for areas where historical data is not present, but prior observations in other areas are leveraged to predict virtual P&R locations.

In an aspect, the disclosed system may make recommendations to users how to better reach their destination based on alternative routes. The system may create personalized and contextual suggestions of vP&R for commuters. The system may make recommendations that consider not only all the map data, dynamic data of traffic and PT but also the personal preferences and mobility patterns of users.

In an aspect, the system may suggest to:
park the car at a different location at a different PT stop of the same line (e.g., one stop before or after), which could possibly benefit everyone in case a travel time is about the same;

suggest a completely different vP&R route depending on traffic conditions and mobility patterns;

as it is difficult for people to take all parameters into account (intermodal route considering PT schedules, time to park, traffic, etc), the system may suggest better routes and itineraries if the system has access to live data, such as real time traffic, event and weather conditions, for example.

The system, in an aspect, may recommend the same commute route but to park at a location which less negatively impacts locals (e.g., a user might not even have known locals were annoyed).

The system may recommend for users to car-pool from a start area to the vP&R area with people that the system could suggest based on similar identified mobility patterns.

In an aspect, for users with electric vehicles, the system may suggest a virtual electric vehicle charging point "park and ride" that allows electric vehicles to charge within a predetermined location from the public transportation stop.

In an aspect, the system may allow adapting the charging capacity to the detected behaviors of the commuters in vP&R areas. Once the system has identified that an area is mostly used by commuters doing vP&R, if EVs are detected in the pool of such vehicles then the system could recommend to install EV charging points with the matching power capacities, knowing, for example, that most of those cars will be there hours.

Therefore there may be no need for fast chargers but rather for multiple charge points with lower capacity. Such locations may correspond to designated charging points or may include locations where businesses or private citizens may rent or lease charging facilities for use by EV drivers.

In another aspect, the system may address reducing the number of commuters who park near subway stations. For example, the disclosed system may encourage the use of alternative modes of transportation. Cities can invest in infrastructure and programs that make it easier and more convenient for commuters to use modes of transportation other than driving. This could include improving the quality and frequency of public building bike lanes and bike-sharing programs and promoting carpooling or vanpooling.

Infrastructure planners may implement demand-based pricing for parking—by charging higher prices for parking during peak periods, cities can discourage commuters from driving and encourage them to use alternative modes of transportation.

Urban planners may encourage the use of park and ride facilities. Cities can build or designate park and ride facilities, which are areas where commuters can leave their cars and take a bus or other mode of transportation to the subway station. This can help reduce the number of cars parked near the subway station. In an aspect, urban planners may limit the availability of parking near subway stations. Cities can also restrict the number of parking spaces available near subway stations or designate certain areas as permit-only parking. This can help discourage commuters from driving and encourage them to use alternative transportation. Or, urban planners may promote the use of transit-oriented development. By encouraging the development of housing, retail, and other amenities near subway stations, cities can make it more convenient for commuters to live and work near the station, reducing the need to drive.

Overall, the most effective strategies for reducing the number of commuters who park near subway stations will depend on the specific context and needs of the community.

So, once the system has identified the area currently facing the vP&R issues or about to face those, planners could take some of those measures in order to reduce or limit its impact.

FIG. 1 illustrates a schematic diagram of a network environment 100 of a system 102 to detect opportunistic mixed mode transportation virtual hubs in accordance with an example aspect. The system 102 may be communicatively coupled with, a user equipment (UE) 104, an OEM cloud 106, a mapping platform 108, via a network 110. The UE 104 may be a vehicle electronics system, onboard automotive electronics/computers, a mobile device such as a smartphone, tablet, smart watch, smart glasses, laptop, wearable device or other UE platforms known to one of skill in the art. The mapping platform 108 may further include a server 108A and a database 108B. The user equipment includes an application 104A, a user interface 104B, and a sensor unit 104C. Further, the server 108A and the database 108B may be communicatively coupled to each other.

The system 102 may comprise suitable logic, circuitry, interfaces and code that may be configured to process the sensor data obtained from the UE 104 for point of interest features or traffic patterns and regulations in a region, that may be used to assist a user or driver to detect opportunistic mixed mode transportation virtual hubs. Such features can also include a parking lot capacity and fill factor, road construction and parking rules and restrictions or a combination thereof.

The system 102 may be communicatively coupled to the UE 104, the OEM cloud 106, and the mapping platform 108 directly via the network 110. Additionally, or alternately, in some example aspects, the system 102 may be communicatively coupled to the UE 104 via the OEM cloud 106 which in turn may be accessible to the system 102 via the network 110.

All the components in the network environment 100 may be coupled directly or indirectly to the network 110. The components described in the network environment 100 may be further broken down into more than one component and/or combined together in any suitable arrangement. Further, one or more components may be rearranged, changed, added, and/or removed. Furthermore, fewer or additional components may be in communication with the system 102, within the scope of this disclosure.

The system 102 may be embodied in one or more of several ways as per the required implementation. For example, the system 102 may be embodied as a cloud-based service or a cloud-based platform. As such, the system 102 may be configured to operate outside the UE 104. However, in some example aspects, the system 102 may be embodied within the UE 104. In each of such aspects, the system 102 may be communicatively coupled to the components shown in FIG. 1 to carry out the desired operations and wherever required modifications may be possible within the scope of the present disclosure.

The UE 104 may be a vehicle electronics system, onboard automotive electronics/computers, a mobile device such as a smartphone, tablet, smart watch, smart glasses, laptop, wearable device and the like that is portable in itself or as a part of another portable/mobile object, such as, a vehicle known to one of skill in the art. The UE 104 may comprise a processor, a memory and a network interface. The processor, the memory and the network interface may be communicatively coupled to each other. In some example aspects, the UE 104 may be associated, coupled, or otherwise integrated with a vehicle of the user, such as an advanced driver assistance system (ADAS), a personal navigation device (PND), a portable navigation device, an infotainment system and/or other device that may be configured to provide route guidance and navigation related functions to the user. In such example aspects, the UE 104 may comprise processing means such as a central processing unit (CPU), storage means such as on-board read only memory (ROM) and random access memory (RAM), acoustic sensors such as a microphone array, position sensors such as a GPS sensor, gyroscope, a LIDAR sensor, a proximity sensor, motion sensors such as accelerometer, a display enabled user interface such as a touch screen display, and other components as may be required for specific functionalities of the UE 104. Additional, different, or fewer components may be provided. For example, the UE 104 may be configured to execute and run mobile applications such as a messaging application, a browser application, a navigation application, and the like. In accordance with an aspect, the UE 104 may be directly coupled to the system 102 via the network 110. For example, the UE 104 may be a dedicated vehicle (or a part thereof) for gathering data for development of the map data in the database 108B. In some example aspects, the UE 104 may be coupled to the system 102 via the OEM cloud 106 and the network 110. For example, the UE 104 may be a consumer mobile phone (or a part thereof) and may be a beneficiary of the services provided by the system 102. In some example aspects, the UE 104 may serve the dual purpose of a data gatherer and a beneficiary device. The UE 104 may be configured to provide sensor data to the system 102. In accordance with an aspect, the UE 104 may process the sensor data for information that may be used to detect opportunistic mixed mode transportation virtual hubs, such as weather, traffic conditions, parking availability, commuter patterns, etc. Further, in accordance with an aspect, the UE 104 may be configured to perform processing related to detect opportunistic mixed mode transportation virtual hubs.

The UE 104 may include the application 104A with the user interface 104B to access one or more applications. The application 104B may correspond to, but not limited to, map related service application, navigation related service application and location-based service application. In other words, the UE 104 may include the application 104A with the user interface 104B. The user interface 104B may be a dedicated user interface configured to show potential locations or contexts of opportunistic mixed mode transportation virtual hubs. The user interface 104B may be in the form of a map depicting regions of high or low virtual P&R indices, according to aspects of the disclosure.

The sensor unit 104C may be embodied within the UE 104. The sensor unit 104C comprising one or more sensors may capture sensor data, in a certain geographic location. In accordance with an aspect, the sensor unit 104C may be built-in, or embedded into, or within interior of the UE 104. The one or more sensors (or sensors) of the sensor unit 104C may be configured to provide the sensor data comprising location data associated with a location of a user. In accordance with an aspect, the sensor unit 104C may be configured to transmit the sensor data to an Original Equipment Manufacturer (OEM) cloud. Examples of the sensors in the sensor unit 104C may include, but not limited to, a microphone, a camera, an acceleration sensor, a gyroscopic sensor, a LIDAR sensor, a proximity sensor, and a motion sensor.

The sensor data may refer to sensor data collected from a sensor unit 104C in the UE 104. In accordance with an aspect, the sensor data may be collected from a large number of mobile phones. In accordance with an aspect, the sensor data may refer to the point cloud data. The point cloud data may be a collection of data points defined by a given coordinates system. In a 3D coordinates system, for instance, the point cloud data may define the shape of some real or created physical objects. The point cloud data may be used to create 3D meshes and other models used in 3D modelling for various fields. In a 3D Cartesian coordinates system, a point is identified by three coordinates that, taken together, correlate to a precise point in space relative to a point of origin. The LIDAR point cloud data may include point measurements from real-world objects or photos for a point cloud data that may then be translated to a 3D mesh or NURBS or CAD model. In accordance with an aspect, the sensor data may be converted to units and ranges compatible with the system 102, to accurately receive the sensor data at the system 102. Additionally, or alternately, the sensor data of a UE 104 may correspond to movement data associated with a user of the user equipment. Without limitations, this may include motion data, position data, orientation data with respect to a reference and the like.

The mapping platform 108 may comprise suitable logic, circuitry, interfaces and code that may be configured to store map data associated with a geographic area in the region of interest related to map features and parking locations that may lead to high or low virtual "P&R" indices, etc. The map data may include traffic features and include historical (or static) traffic features such as road layouts, pre-existing road networks, business, educational and recreational locations, POI locations, historical and real-time weather conditions in the region or a combination thereof. The server 108A of the mapping platform 108 may comprise processing means and communication means. For example, the processing means may comprise one or more processors configured to process requests received from the system 102 and/or the UE 104. The processing means may fetch map data from the database 108B and transmit the same to the system 102 and/or the UE 104 in a suitable format. In one or more example aspects, the mapping platform 108 may periodically communicate with the UE 104 via the processing means to update a local cache of the map data stored on the UE 104. Accordingly, in some example aspects, map data may also be stored on the UE 104 and may be updated based on periodic communication with the mapping platform 108.

In an aspect, the map data may include, and the database 108B of the mapping platform 108 may store real-time, dynamic data about road features to detect opportunistic mixed mode transportation virtual hubs. For example, real-time data may be collected to detect opportunistic mixed mode transportation virtual hubs, such as traffic, parking locations and capacities, PT routes and schedules, etc. Other data records may include computer code instructions and/or algorithms for executing a trained machine learning model that is capable of assisting to detect opportunistic mixed mode transportation virtual hubs.

The database 108B of the mapping platform 108 may store map data of one or more geographic regions that may correspond to a city, a province, a country or of the entire world. The database 108B may store point cloud data collected from the UE 104. The database 108B may store data such as, but not limited to, node data, road segment data, link data, point of interest (POI) data, link identification information, and heading value records. The database 108B may also store cartographic data, routing data, and/or maneuvering data. According to some example aspects, the road segment data records may be links or segments representing roads, streets, or paths, as may be used in calculating a route or recorded route information for determination of one or more P&R routes. The node data may be end points corresponding to the respective links or segments of road segment data. The road link data and the node data may represent a road network, such as used by vehicles, cars, trucks, buses, motorcycles, and/or other entities for identifying location of building.

Optionally, the database 108B may contain path segment and node data records, such as shape points or other data that may represent raised features and vehicle speed control indications, links or areas in addition to or instead of the vehicle road record data. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The database 108B may also store data about the POIs and their respective locations in the POI records. The database 108B may additionally store data about places, such as cities, towns, or other communities, and other geographic features such as bodies of water, and mountain ranges. Such place or feature data can be part of the POI data or can be associated with POIs or POI data records (such as a data point used for displaying or representing a position of a city). In addition, the database 108B may include event data (e.g., traffic incidents, construction activities, scheduled events, unscheduled events, accidents, diversions etc.) associated with the POI data records or other records of the database 108B. Optionally or additionally, the database 108B may store 3D building maps data (3D map model of objects) of structures, topography and other visible features surrounding roads and streets, including raised features on the roads.

The database 108B may be a master map database stored in a format that facilitates updating, maintenance, and development. For example, the master map database or data in the master map database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the UE 104. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received map database in a delivery format to produce one or more compiled navigation databases.

As mentioned above, the database 108B may be a master geographic database, but in alternate aspects, the database 108B may be embodied as a client-side map database and may represent a compiled navigation database that may be used in or with end user devices (such as the UE 104) to provide navigation and/or map-related functions. In such a case, the database 108B may be downloaded or stored on the end user devices (such as the UE 104).

The network 110 may comprise suitable logic, circuitry, and interfaces that may be configured to provide a plurality of network ports and a plurality of communication channels for transmission and reception of data, such as the sensor data, map data from the database 108B, etc. Each network port may correspond to a virtual address (or a physical machine address) for transmission and reception of the communication data. For example, the virtual address may be an Internet Protocol Version 4 (IPv4) (or an IPV6 address) and the physical address may be a Media Access Control (MAC) address. The network 110 may be associated with an application layer for implementation of communication protocols based on one or more communication requests from at least one of the one or more communication devices. The communication data may be transmitted or received, via the communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

Examples of the network 110 may include, but is not limited to a wireless channel, a wired channel, a combination of wireless and wired channel thereof. The wireless or wired channel may be associated with a network standard which may be defined by one of a Local Area Network (LAN), a Personal Area Network (PAN), a Wireless Local Area Network (WLAN), a Wireless Sensor Network (WSN), Wireless Area Network (WAN), Wireless Wide Area Network (WWAN), a Long Term Evolution (LTE) networks (for e.g. LTE-Advanced Pro), 5G New Radio networks, ITU-IMT 2020 networks, a plain old telephone service (POTS), and a Metropolitan Area Network (MAN). Additionally, the wired channel may be selected on the basis of bandwidth criteria. For example, an optical fiber channel may be used for a high bandwidth communication. Further, a coaxial cable-based or Ethernet-based communication channel may be used for moderate bandwidth communication.

The system, apparatus, method and computer program product described above may be any of a wide variety of computing devices and may be embodied by either the same or different computing devices. The system, apparatus, etc. may be embodied by a server, a computer workstation, a distributed network of computing devices, a personal computer or any other type of computing device. The system, apparatus, method and computer program product may be configured to determine a driving decision may similarly be embodied by the same or different server, computer workstation, distributed network of computing devices, personal computer, or other type of computing device.

Alternatively, the system, apparatus, method and computer program product may be embodied by a computing device on board a vehicle, such as a computer system of a vehicle, e.g., a computing device of a vehicle that supports safety-critical systems such as the powertrain (engine, transmission, electric drive motors, etc.), steering (e.g., steering assist or steer-by-wire), and/or braking (e.g., brake assist or brake-by-wire), a navigation system of a vehicle, a control system of a vehicle, an electronic control unit of a vehicle, an autonomous vehicle control system (e.g., an autonomous-driving control system) of a vehicle, a mapping system of a vehicle, an Advanced Driver Assistance System (ADAS) of a vehicle), or any other type of computing device carried by the vehicle. Still further, the apparatus may be embodied by a computing device of a driver or passenger on board the vehicle, such as a mobile terminal, e.g., a personal digital assistant (PDA), mobile telephone, smart phone, personal navigation device, smart watch, tablet computer, or any combination of the aforementioned and other types of portable computer devices.

FIG. 2 illustrates a block diagram 200 of the system 102, exemplarily illustrated in FIG. 1, to detect opportunistic mixed mode transportation virtual hubs, in accordance with an example aspect. FIG. 2 is described in conjunction with elements from FIG. 1.

As shown in FIG. 2, the system 102 may comprise a processing means such as a processor 202, storage means such as a memory 204, a communication means, such as a network interface 206, an input/output (I/O) interface 208, and a machine learning model 210. The processor 202 may retrieve computer executable instructions that may be stored in the memory 204 for execution of the computer executable instructions. The system 102 may connect to the UE 104 via the I/O interface 208. The processor 202 may be communicatively coupled to the memory 204, the network interface 206, the I/O interface 208, and the machine learning model 210.

The processor 202 may comprise suitable logic, circuitry, and interfaces that may be configured to execute instructions stored in the memory 204. The processor 202 may obtain sensor data associated with commuter and traffic mobility patterns. The sensor data may be captured by one or more UE, such as the UE 104. The processor 202 may be configured to determine parking and mobility patterns in the region of navigation, based on the sensor data. The processor 202 may be further configured to determine, using a trained machine learning model in conjunction with ground truth of the region, one or more potential locations of high or low virtual "P&R" indices.

Examples of the processor 202 may be an Application-Specific Integrated Circuit (ASIC) processor, a Complex Instruction Set Computing (CISC) processor, a central processing unit (CPU), an Explicitly Parallel Instruction Computing (EPIC) processor, a Very Long Instruction Word (VLIW) processor, and/or other processors or circuits. The processor 202 may implement a number of processor technologies known in the art such as a machine learning model, a deep learning model, such as a recurrent neural network (RNN), a convolutional neural network (CNN), and a feed-forward neural network, or a Bayesian model. As such, in some aspects, the processor 202 may include one or more processing cores configured to perform independently. A multi-core processor may enable multiprocessing within a single physical package.

Additionally, or alternatively, the processor 202 may include one or more processors configured in tandem via the bus to enable independent execution of instructions, pipelining and/or multithreading. Additionally, or alternatively, the processor 202 may include one or processors capable of processing large volumes of workloads and operations to provide support for big data analysis. However, in some cases, the processor 202 may be a processor specific device (for example, a mobile terminal or a fixed computing device) configured to employ an aspect of the disclosure by further configuration of the processor 202 by instructions for performing the algorithms and/or operations described herein.

In some aspects, the processor 202 may be configured to provide Internet-of-Things (IoT) related capabilities to users of the UE 104 disclosed herein. The IoT related capabilities may in turn be used to provide smart city solutions by providing real time weather updates, big data analysis, and sensor-based data collection for providing navigation and parking information for certain areas. The environment may be accessed using the I/O interface 208 of the system 102 disclosed herein.

The memory 204 may comprise suitable logic, circuitry, and interfaces that may be configured to store a machine code and/or instructions executable by the processor 202. The memory 204 may be configured to store information including processor instructions for training the machine learning model. The memory 204 may be used by the processor 202 to store temporary values during execution of processor instructions. The memory 204 may be configured to store different types of data, such as, but not limited to, sensor data from the UE 104. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 206 may comprise suitable logic, circuitry, and interfaces that may be configured to communicate with the components of the system 102 and other systems and devices in the network environment 100, via the network 110. The network interface 206 may communicate with the UE 104, via the network 110 under the control of the processor 202. In one aspect, the network interface 206 may be configured to communicate with the sensor unit 104C disclosed in the detailed description of FIG. 1. In an alternative aspect, the network interface 206 may be configured to receive the sensor data from the OEM cloud 106 over the network 110 as described in FIG. 1. In some example aspects, the network interface 206 may be configured to receive location information of a user associated with a UE (such as, the UE 104), via the network 110. In accordance with an aspect, a controller of the UE 104 may receive the sensor data from a positioning system (for example: a GPS based positioning system) of the UE 104. The network interface 206 may be implemented by use of known technologies to support wired or wireless communication of the system 102 with the network 110. Components of the network interface 206 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer circuit.

The I/O interface 208 may comprise suitable logic, circuitry, and interfaces that may be configured to operate as an I/O channel/interface between the UE 104 and different operational components of the system 102 or other devices in the network environment 100. The I/O interface 208 may facilitate an I/O device (for example, an I/O console) to receive an input (e.g., sensor data from the UE 104 for a time duration) and present an output to one or more UE (such as, the UE 104) based on the received input. In accordance with an aspect, the I/O interface 208 may obtain the sensor data from the OEM cloud 106 to store in the memory 202. The I/O interface 208 may include various input and output ports to connect various I/O devices that may communicate with different operational components of the system 102. In accordance with an aspect, the I/O interface 208 may be configured to output locations of virtual "P&Rs" to a user device, such as, the UE 104 of FIG. 1.

In example aspects, the I/O interface 208 may be configured to provide the data associated with detecting opportunistic mixed mode transportation virtual hubs to the database 108A to update the map of a certain geographic region. In accordance with an aspect, a user requesting information in a geographic region may be updated about historical (or static) traffic conditions, real-time or historical weather conditions, parking locations and capacities, PT locations, etc. Examples of the input devices may include, but are not limited to, a touch screen, a keyboard, a mouse, a joystick, a microphone, and an image-capture device. Examples of the output devices may include, but are not limited to, a display, a speaker, a haptic output device or other sensory output devices.

In accordance with an aspect, the processor 202 may train the machine learning model 210 to detect opportunistic mixed mode transportation virtual hubs. In an aspect of the disclosure, the processor 202 may predict, based on the trained machine learning model in conjunction with ground truth of the region, one or more virtual "P&R" s. In an aspect, a weighted linear regression model may be used to predict, based on the trained machine learning model in conjunction with ground truth of the region, one or more potential locations of virtual "P&Rs" in an area. In another aspect, a look-up table for predicting, based on the trained machine learning model in conjunction with ground truth of the region, one or more potential locations of virtual "P&Rs" in an area.

In another aspect, a machine learning model, such as trained machine learning model 210 discussed earlier, may be used to detect opportunistic mixed mode transportation virtual hubs. In accordance with an aspect, the trained machine learning model 210 may be trained offline to obtain a classifier model to automatically predict, using a trained machine learning model trained on ground truth of a region, one or more potential locations of virtual "P&Rs" in an area. For the training of the trained machine learning model 210, different feature selection techniques and classification techniques may be used. The system 102 may be configured to obtain the trained machine learning model 210 and the trained machine learning model 210 model may leverage historical information and real-time data to automatically predict, using a trained machine learning model trained on ground truth of a region, one or more potential locations of virtual "P&Rs" in an area. In one aspect, supervised machine learning techniques may be utilized where ground truth data is used to train the model for different scenarios and then in areas where there is not sufficient ground truth data, the trained machine learning model 210 can be used to predict features or results.

In an aspect, the trained machine learning model 210 may be complemented or substituted with a transfer learning model. The transfer learning model may be used when the contextual factors related to opportunistic mixed mode transportation virtual hubs, such as commuter mobility patterns, parking locations, parking lot capacity, PT locations and schedules, parking restrictions, etc., in the area are unavailable, sparse, incomplete, corrupted or otherwise unreliable for predicting detect opportunistic mixed mode transportation virtual hubs. The transfer learning model may then use historical commuter mobility patterns, parking locations, parking lot capacity, PT locations and schedules, parking restrictions, etc., for detect opportunistic mixed mode transportation virtual hubs in a new area.

Examples of the machine learning model 210 may include, but not limited to, Decision Tree (DT), Random Forest, and Ada Boost. In accordance with an aspect, the memory 204 may include processing instructions for training of the machine learning model 210 with data set that may be real-time (or near real time) data or historical data. In accordance with an aspect, the data may be obtained from one or more service providers.

FIG. 3 illustrates an example map or geographic database 307, which may include various types of geographic data 340. The database may be similar to or an example of the database 108B. The data 340 may include but is not limited to node data 342, road segment or link data 344, map object and point of interest (POI) data 346, P&R data records 348, or the like (e.g., other data records 350 such as traffic data, commuter mobility patterns, parking locations, PT stops, etc.). Other data records may include computer code instructions and/or algorithms for executing a trained machine learning model that is capable of detecting opportunistic mixed mode transportation virtual hubs.

A profile of end user mobility graph and personal activity information may be obtained by any functional manner including those detailed in U.S. Pat. Nos. 9,766,625 and 9,514,651, both of which are incorporated herein by reference. This data may be stored in one of more of the databases discussed above including as part of the P&R data records 348 in some aspects. This data may also be stored elsewhere and supplied to the system 102 via any functional means.

In one aspect, the following terminology applies to the representation of geographic features in the database 307. A "Node"—is a point that terminates a link, a "road/line segment"—is a straight line connecting two points, and a "Link" (or "edge") is a contiguous, non-branching string of one or more road segments terminating in a node at each end. In one aspect, the geographic database 307 follows certain conventions. For example, links do not cross themselves and do not cross each other except at a node. Also, there are no duplicated shape points, nodes, or links. Two links that connect each other have a common node.

The geographic database 307 may also include cartographic data, routing data, and/or maneuvering data as well as indexes 352. According to some example aspects, the road segment data records may be links or segments representing roads, streets, or paths, as may be used in calculating a route or recorded route information for determination of virtual "P&Rs". The node data may be end-points (e.g., intersections) corresponding to the respective links or segments of road segment data. The road link data and the node data may represent a road network, such as used by vehicles, cars, trucks, buses, motorcycles, bikes, scooters, and/or other entities.

Optionally, the geographic database 307 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The geographic database 307 can include data about the POIs and their respective locations in the POI records. The geographic database 307 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database can include event data (e.g., traffic incidents, construction activities, scheduled events, unscheduled events, etc.) associated with the POI data records or other records of the map database.

The geographic database 107 may be maintained by a content provider e.g., the map data service provider and may be accessed, for example, by the content or service provider processing server. By way of example, the map data service provider can collect geographic data and dynamic data to generate and enhance the map database and dynamic data such as weather- and traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that may be available is vehicle data provided by vehicles, such as mobile device, as they travel the roads throughout a region.

The geographic database 307 may be a master map database, such as an HD map database, stored in a format that facilitates updates, maintenance, and development. For example, the master map database or data in the master map database can be in an Oracle spatial format or other spatial format (e.g., accommodating different map layers), such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the geographic database 307 may be a master geographic database, but in alternate aspects, a client-side map database may represent a compiled navigation database that may be used in or with end user devices to provide navigation and/or map-related functions. For example, the map database may be used with the mobile device to provide an end user with navigation features. In such a case, the map database can be downloaded or stored on the end user device which can access the map database through a wireless or wired connection, such as via a processing server and/or a network, for example.

The records for P&R data records 348 may include various points of data such as, but not limited to: a detailed map of the area; parking locations and parking lot capacities; commuter patterns and mobility patterns; road and parking lot restrictions; PT locations and schedules; local resident mobility patterns; local POI schedules and events, etc.

FIG. 4 illustrates a flowchart 400 for acts taken in an exemplary method for detecting opportunistic mixed mode transportation virtual hubs, in accordance with an aspect. More, fewer or different steps may be provided. FIG. 4 is explained in conjunction with FIG. 1 to FIG. 3. The control starts at act 402.

At act 402, the system 102 may identify, from probe data, an area where an on-street parking capacity and/or an off-street parking capacity is full during week-days.

At act 404, the system 102 may identify whether observed mobility patterns of a vehicle parking in the area comprise commuter parking patterns. For example, in an aspect, the system 102 may correlate arriving between 7-9 AM and leaving 5-7 PM as commuter parking patterns. Such mobility patterns may be observed and collected by video cameras positioned in the area of interest.

At act 406, the system 102 may identify, based on map data, a location of a public transportation stop within a predetermined range of the area. In an aspect, a proximity of 1 km-1.5 km may be a useful range to consider.

At act 408, the system 102 may determine, based on historical traffic data and real-time traffic data, whether an observed traffic congestion increases from a historical traffic congestion level for observed traffic from the public transportation stop to a city center.

At act 410, the system 102 may determine whether a full on-street parking capacity and/or a full off-street parking capacity during the day negatively modifies a mobility pattern of a resident of the area. For example, in an aspect, the system 102 may observe and collect data on local resident action such as, e.g., making detours, taking longer time to park and access local stores, etc. The system 102 may use probe data and mobility patterns of the local people to assess the impact.

At act 412, the system 102 may determine, based on at least one of the observed mobility pattern of the vehicle parking in the area, the observed traffic congestion and the mobility pattern of the resident of the area, a current virtual "park and ride" index, where the current virtual "park and ride" index comprises a likelihood of the vehicle parking at a current virtual "park and ride." In an aspect, the current virtual "park and ride" may be scored between 0 and 1. In an aspect, the current virtual "park and ride" may be presented on a visual display, such as a map of the area.

FIG. 5 illustrates a flowchart 500 for additional acts taken in an exemplary method for detecting opportunistic mixed mode transportation virtual hubs, in accordance with an aspect. More, fewer or different steps may be provided. The control starts at act 502 after completing act 412 in FIG. 4.

At act 502, the system 102 may determine, using a trained machine learning model based on the current virtual "park and ride" index and area map features, a future virtual "park and ride" index, where the future virtual "park and ride" index comprises a likelihood of the vehicle parking at a future virtual "park and ride." In an aspect, the trained ML model may be complemented or substituted with a transfer learning model where information related to virtual "P&Rs" is not available or corrupted.

In an aspect, the trained ML will be learning from those patterns, correlated with map features, in order to predict which areas are likely to be used as "Virtual P&R areas" by users and possibly see similar issues in the future. In an aspect, the output of the trained ML model will be a score called vP&R_Future_Index, between 0 and 1.

FIG. 6 illustrates a flowchart 600 for additional acts taken in an exemplary method for detecting opportunistic mixed mode transportation virtual hubs, in accordance with an aspect. More, fewer or different steps may be provided. The control starts at act 602 after completing act 502 in FIG. 5.

At act 602, the system 102 may provide, to a user, a recommended virtual "park and ride" based on the future virtual "park and ride" index, map data, the real-time traffic data, public transportation data, user travel preferences and/or user mobility patterns. In an aspect, the system 102 may provide, based on the recommended virtual "park and ride", suggestions to: park the vehicle at a different public transportation stop to reduce traffic congestion; choose a different virtual "park and ride" route to reduce an impact on the mobility pattern of the resident of the area; and/or recommend car-pooling from a start area to the recommended virtual "park and ride" based on similar mobility patterns of other commuters.

As it is difficult for people to take all parameters into account (intermodal route considering PT schedules, time to park, traffic, etc), the system 102, in an aspect, suggest better commuter routes or PT usage if the system 102 has access to live data. For example, the system 102 may recommend to keep the same commute route but park at a location which is less negatively impactful for locals (user might not even have known locals were annoyed). Or, the system 102 may recommend car pooling from the start area to the vP&R area with people that the system could suggest based on similar identified mobility patterns.

In an aspect, the system 102 may suggest a virtual electric vehicle charging point "park and ride" that allows electric vehicles to charge within a predetermined location from the public transportation stop.

In application, the disclosed system 102 may be used for trend monitoring. By monitoring such movement data over time, the system 102 may be able to detect trends in all areas. Those insights can help classify the areas which are already having the above mentioned issues versus the ones which are trending towards those issues in a near future. In an aspect, in a similar way, such learnings can be used as inputs to simulate the impact of opening new bus/PT lines, EVCPs or even PT stops. Typically, the system 102 could highlight that adding a stop at a given location would likely attract many people to do some vP&R, there may be previous and next PT stops that are crowded with parked cars.

In another example, if not a residential area, this could be a good idea as it would create some relief for the other areas. If a residential area, this needs to be discussed with the people living there as it will impact them.

In another application, the system 102 may detect that an area is not full due to the proximity of a large office. In that instance, the system 102 may will study the mobility patterns of people in the areas to understand their end-to-end journeys until their final destinations based on probe data. If people parking in an area are not taking the nearby PT, then this will be detected and the system 102 will determine that, although this area's parking lots are full and a PT stop is present, this is not due to commuters doing vP&R.

Other applications possible for the disclosed system 102 include:

For PT agencies: more efficient use of their trains and less complaints near the PT stops;
  for cities: better movement of people/commuters overall;
  for local residents: less disruptions/annoyances for those living near PT stations;
  for local stores: more business, more customers as people can park to get there;
  PT agencies might also consider changing their zone price structure if needed. Indeed, it could be that some people decide to park in some areas because the ticket of the PT is cheaper there. By analyzing all the data, including the PT price per area, the system 102 could find a correlation between more people parking in a given area due to lower prices (eg. just before a border price change). Detecting areas which have such issues could lead PT agencies to modify users' behaviors by simply adjusting the PT prices or the geometry of limit of the zones, which might be cheaper than building new P&R areas in some cases.

Blocks of the flowcharts 400-600 support combinations of means for performing the specified functions and combinations of operations for performing the specified functions for performing the specified functions. It will also be understood that one or more blocks of the flowcharts 400-600, and combinations of blocks in the flowcharts 400-600, can be implemented by special purpose hardware-based computer systems which perform the specified functions, or combinations of special purpose hardware and computer instructions.

Alternatively, the system may comprise means for performing each of the operations described above. In this regard, according to an example aspect, examples of means for performing operations may comprise, for example, the processor 202 and/or a device or circuit for executing instructions or executing an algorithm for processing information as described above.

Although the aforesaid description of FIGS. 1-45 is provided with reference to the sensor data, however, it may be understood that the disclosure would work in a similar manner for different types and sets of data as well. The system 102 may generate/train the machine learning model 210 to evaluate different sets of data at various geographic locations. The update may be provided as a run time update or a pushed update.

It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 14 of an apparatus 10 employing an aspect of the present disclosure and executed by the processing circuitry 12. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other aspects of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific aspects disclosed and that modifications and other aspects are intended to be included within the scope of the appended claims. Furthermore, in some aspects, additional optional operations may be included. Modifications, additions, or amplifications to the operations above may be performed in any order and in any combination.

Moreover, although the foregoing descriptions and the associated drawings describe example aspects in the context of certain example combinations of elements and/or functions, it should be appreciated that different combinations of elements and/or functions may be provided by alternative aspects without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A computer implemented method to detect opportunistic mixed mode transportation virtual hubs, the method comprising:
    identifying, from probe data, an area where an on-street parking capacity and/or an off-street parking capacity is full during week-days;
    identifying whether observed mobility patterns of a vehicle parking in the area comprise commuter parking patterns;
    Identifying, based on map data, a location of a public transportation stop within a predetermined range of the area;
    determining, based on historical traffic data and real-time traffic data, whether an observed traffic congestion increases from a historical traffic congestion level for observed traffic from the public transportation stop to a city center;
    determining whether a full on-street parking capacity and/or a full off-street parking capacity during the day negatively modifies a mobility pattern of a resident of the area; and
    determining, based on at least one of the observed mobility pattern of the vehicle parking in the area, the observed traffic congestion and the mobility pattern of the resident of the area, a current virtual park and ride index, where the current virtual park and ride index comprises a likelihood of the vehicle parking at a current virtual park and ride hub;
    updating a database with a recommended virtual park and ride hub based on the future virtual park and ride index, map data, the real-time traffic data, public transportation data; and
    activating an autonomous vehicle control system in response to the recommended virtual park and ride hub.

2. The method of claim 1, further comprising determining, using a trained machine learning model based on the current virtual park and ride index and area map features, a future virtual park and ride index, where the future virtual park and ride index comprises a likelihood of the vehicle parking at a future virtual park and ride hub.

3. The method of claim 2, further comprising providing, to a user, a recommended virtual park and ride hub based on the future virtual park and ride index, map data, the real-time traffic data, public transportation data, user travel preferences and/or user mobility patterns.

4. The method of claim 3, further comprising providing, based on the recommended virtual park and ride hub, suggestions to: park the vehicle at a different public transportation stop to reduce traffic congestion; choose a different virtual park and ride route to reduce an impact on the mobility pattern of the resident of the area; and/or recommend car-pooling from a start area to the recommended virtual park and ride hub based on similar mobility patterns of other commuters.

5. The method of claim 3, further comprising suggesting a virtual electric vehicle charging point park and ride hub that allows electric vehicles to charge within a predetermined location from the public transportation stop.

6. The method of claim 1, where the commuter parking patterns are determined from video data collected by cameras positioned in the area.

7. The method of claim 3, where providing, to the user, the recommended virtual park and ride hub comprises providing, to the user, the recommended virtual park and ride hub on a visual display.

8. A system to detect opportunistic mixed mode transportation virtual hubs, comprising:
at least one memory configured to store computer executable instructions; and
at least one processor configured to execute the computer executable instructions to:
identify, from probe data, an area where an on-street parking capacity and/or an off-street parking capacity is full during week-days;
identify whether observed mobility patterns of a vehicle parking in the area comprise commuter parking patterns;
Identify, based on map data, a location of a public transportation stop within a predetermined range of the area;
determine, based on historical traffic data and real-time traffic data, whether an observed traffic congestion increases from a historical traffic congestion level for observed traffic from the public transportation stop to a city center;
determine whether a full on-street parking capacity and/or a full off-street parking capacity during the day negatively modifies a mobility pattern of a resident of the area; and
determine, based on at least one of the observed mobility pattern of the vehicle parking in the area, the observed traffic congestion and the mobility pattern of the resident of the area, a current virtual park and ride index, where the current virtual park and ride index comprises a likelihood of the vehicle parking at a current virtual park and ride hub;
hub;
update a database with a recommended virtual park and ride hub based on the future virtual park and ride index, map data, the real-time traffic data, public transportation data; and
activate an autonomous vehicle control system in response to the recommended virtual park and ride hub.

9. The system of claim 8, further comprising computer executable instructions to determine, using a trained machine learning model based on the current virtual park and ride index and area map features, a future virtual park and ride index, where the future virtual park and ride index comprises a likelihood of the vehicle parking at a future virtual park and ride hub.

10. The system of claim 9, further comprising computer executable instructions to provide, to a user, a recommended virtual park and ride hub based on the future virtual park and ride index, map data, the real-time traffic data, public transportation data, user travel preferences and/or user mobility patterns.

11. The system of claim 10, further comprising computer executable instructions to provide, based on the recommended virtual park and ride hub, suggestions to: park the vehicle at a different public transportation stop to reduce traffic congestion; choose a different virtual park and ride route to reduce an impact on the mobility pattern of the resident of the area; and/or recommend car-pooling from a start area to the recommended virtual park and ride hub based on similar mobility patterns of other commuters.

12. The system of claim 10, further comprising computer executable instructions to suggest a virtual electric vehicle charging point park and ride hub that allows electric vehicles to charge within a predetermined location from the public transportation stop.

13. The system of claim 8, where the commuter parking patterns are determined from video data collected by cameras positioned in the area.

14. The system of claim 10, where the computer executable instructions to provide, to the user, the recommended virtual park and ride hub comprise computer executable instructions to provide, to the user, the recommended virtual park and ride hub on a visual display.

* * * * *